US012713366B2

(12) United States Patent
Teyeb et al.

(10) Patent No.: US 12,713,366 B2
(45) Date of Patent: Aug. 18, 2026

(54) METHODS AND SYSTEMS FOR EFFICIENT UPLINK (UL) SYNCHRONIZATION MAINTENANCE WITH A DEACTIVATED SECONDARY CELL GROUP (SCG)

(71) Applicant: INTERDIGITAL PATENT HOLDINGS, INC., Wilmington, DE (US)

(72) Inventors: Oumer Teyeb, Montreal (CA); Martino Freda, Laval (CA); Yugeswar Deenoo, Chalfont, PA (US); Virgil Comsa, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 393 days.

(21) Appl. No.: 18/271,712

(22) PCT Filed: Jan. 12, 2022

(86) PCT No.: PCT/US2022/012075
§ 371 (c)(1),
(2) Date: Jul. 11, 2023

(87) PCT Pub. No.: WO2022/155170
PCT Pub. Date: Jul. 21, 2022

(65) Prior Publication Data

US 2024/0323873 A1 Sep. 26, 2024

Related U.S. Application Data

(60) Provisional application No. 63/136,531, filed on Jan. 12, 2021.

(51) Int. Cl.
*H04W 56/00* (2009.01)
*H04W 52/14* (2009.01)
(Continued)

(52) U.S. Cl.
CPC ..... *H04W 56/0005* (2013.01); *H04W 52/146* (2013.01); *H04W 56/001* (2013.01);
(Continued)

(58) Field of Classification Search
CPC ......... H04W 56/0005; H04W 56/0045; H04W 74/0833; H04W 56/001; H04W 72/21;
(Continued)

(56) References Cited

U.S. PATENT DOCUMENTS

2011/0044188 A1* 2/2011 Luo .................... H04L 27/2607 370/252
2013/0039195 A1* 2/2013 Weng .................... H04W 48/20 370/252

(Continued)

FOREIGN PATENT DOCUMENTS

WO WO-2014089069 A1 * 6/2014 ............ H04W 76/27
WO 2020/113999 6/2020

OTHER PUBLICATIONS

Huawei et al., "Discussion on SCG deactivation and activation," 3GPP TSG-RAN WG2 Meeting #112-e, R2-2010124 (Nov. 2-13, 2020).

(Continued)

*Primary Examiner* — Michael K Phillips
(74) *Attorney, Agent, or Firm* — VOLPE KOENIG

(57) ABSTRACT

A wireless transmit/receive unit (WTRU) may receive indication information indicating an uplink (UL) configuration and one or more triggering conditions for transmission of UL signals. Based on reception of a deactivation command or fulfillment of a condition for WTRU-triggered deactivation of a secondary cell group (SCG), the WTRU may deactivate the SCG. Based on the UL configuration and the fulfillment of the one or more triggering conditions, the WTRU may transmit the UL signals via the SCG. The
(Continued)

WTRU may receive, via a master cell group (MCG), an in-synch or out-of-synch indication for the SCG. Based on the reception of the out-of-synch indication including a timing advance (TA) delta value, the WTRU may update a UL TA towards the SCG based on the TA delta value. Using the updated UL TA towards the SCG, the WTRU may transmit one or more subsequent UL signals via the SCG.

18 Claims, 7 Drawing Sheets

(51) Int. Cl.
*H04W 72/21* (2023.01)
*H04W 74/0833* (2024.01)
*H04W 76/15* (2018.01)

(52) U.S. Cl.
CPC ... *H04W 56/0015* (2013.01); *H04W 56/0045* (2013.01); *H04W 72/21* (2023.01); *H04W 74/0833* (2013.01); *H04W 76/15* (2018.02)

(58) Field of Classification Search
CPC ... H04W 72/231; H04W 76/15; H04W 76/28; H04W 52/146; H04W 56/0015; Y02D 30/70; H04L 5/0051
See application file for complete search history.

(56) References Cited

U.S. PATENT DOCUMENTS

| | | | | |
|---|---|---|---|---|
| 2013/0272233 | A1* | 10/2013 | Dinan | H04L 5/001 370/329 |
| 2014/0328309 | A1* | 11/2014 | Comstock | H04W 72/541 370/329 |
| 2019/0053135 | A1* | 2/2019 | Hahn | H04W 76/30 |
| 2021/0266849 | A1* | 8/2021 | Uchino | H04W 56/0045 |
| 2022/0022067 | A1* | 1/2022 | Kim | H04L 5/0098 |
| 2022/0191968 | A1* | 6/2022 | Tsuboi | H04W 56/001 |

OTHER PUBLICATIONS

IEEE Standard for Information Technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2020 (Dec. 3, 2020).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information Technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
IEEE Standard for Information Technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).
Interdigital Inc., "Measurements and maintenance of UL synch with a deactivated SCG," 3GPP RAN WG2 Meeting #115-e, R2-2108489 (Aug. 16-27, 2021).
Interdigital Inc., "Measurements and maintenance of UL synch with a deactivated SCG," 3GPP RAN WG2 Meeting #113-bis-e, R2-2103682 (Apr. 12-20, 2021).
Interdigital Inc., "Measurements and maintenance of UL synch with a deactivated SCG," 3GPP RAN WG2 Meeting #114--e, R2-2105798 (May 17-29, 2021).
Interdigital Inc., "On Support of Activation/Deactivation for SCG," 3GPP RAN WG2 Meeting #113-e, R2- 2101312 (Jan. 25-Feb. 5, 2021).
LG Electronics Inc., "Efficient SCG Activation mechanism," 3GPP TSG-RAN WG2 Meeting #112-e, R2-2010283 (Nov. 2-13, 2020).
Qualcomm Incorporated, "Introducing suspension of SCG," 3GPP TSG RAN WG2 Meeting #107bis, R2-1912197, Chongqing, China (Oct. 14-18, 2019).
Third Generation Partnership Project, "Technical Specification Group Radio Access Network; NR; Physical layer procedures for control (Release 16)," 3GPP TS 38.213 V16.1.0 (Mar. 2020).
Third Generation Partnership Project, "Technical Specification Group Radio Access Network; NR; Physical layer procedures for control (Release 16)," 3GPP TS 38.213 V16.3.0 (Sep. 2020).
Third Generation Partnership Project, "Technical Specification Group Radio Access Network; NR; Physical layer procedures for control (Release 16)," 3GPP TS 38.213 V16.7.0 (Sep. 2021).
Third Generation Partnership Project, "Technical Specification Group Radio Access Network; NR; Medium Access Control (MAC) protocol specification (Release 16)," 3GPP TS 38.321 V16.1.0 (Jul. 2020).
Third Generation Partnership Project, "Technical Specification Group Radio Access Network; NR; Medium Access Control (MAC) protocol specification (Release 16)," 3GPP TS 38.321 V16.6.0 (Sep. 2021).
Third Generation Partnership Project, "Technical Specification Group Radio Access Network; NR; Medium Access Control (MAC) protocol specification (Release 16)," 3GPP TS 38.321 V16.2.1 (Sep. 2020).
Third Generation Partnership Project, "Technical Specification Group Radio Access Network; NR; Radio Resource Control (RRC) protocol specification (Release 16)," 3GPP TS 38.331 V16.1.0 (Jul. 2020).
Third Generation Partnership Project, "Technical Specification Group Radio Access Network; NR; Radio Resource Control (RRC) protocol specification (Release 16)," 3GPP TS 38.331 V16.6.0 (Sep. 2021).
Third Generation Partnership Project, "Technical Specification Group Radio Access Network; NR; Radio Resource Control (RRC) protocol specification (Release 16)," 3GPP TS 38.331 V16.2.0 (Sep. 2020).
Vivo, "UE behavior for a suspended SCG," 3GPP TSG-RAN WG2 Meeting #108, R2-1914944, Reno Nevada (Nov. 18-22, 2019).

* cited by examiner

Figure 1C:
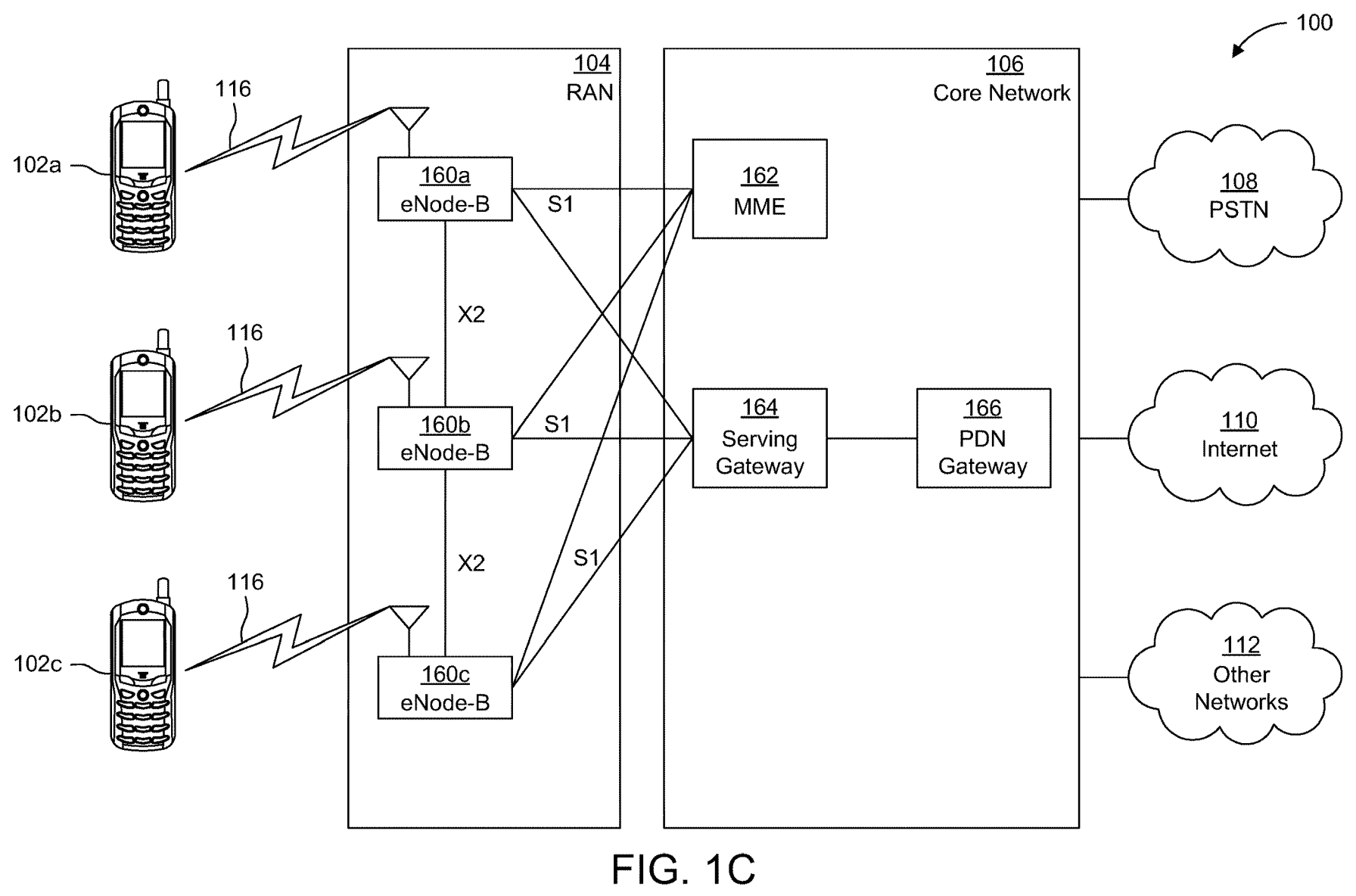

100

108 PSTN

110 Internet

112 Other Networks

106 Core Network

162 MME

164 Serving Gateway

166 PDN Gateway

104 RAN 160a eNode-B 160b eNode-B 160c eNode-B

METHODS AND SYSTEMS FOR EFFICIENT UPLINK (UL) SYNCHRONIZATION MAINTENANCE WITH A DEACTIVATED SECONDARY CELL GROUP (SCG)

CROSS-REFERENCE TO RELATED APPLICATION

This application is the U.S. National Stage, under 35 U.S.C. § 371, of International Application No. PCT/US2022/012075 filed Jan. 12, 2022, which claims the benefit of U.S. Provisional Application No. 63/136,531, filed Jan. 12, 2021, the contents of which are incorporated herein by reference.

BACKGROUND

A wireless transmit/receive unit (WTRU) may be configured to utilize resources provided by two different nodes connected via non-ideal backhaul, wherein the nodes may provide access using the same or different radio access technologies (RATs). The nodes may be base stations. One node may act as a Master Node (MN) controlling resources associated with one or more cells called a Master Cell Group (MCG), and another node may act as a secondary node (SN) controlling resources associated with one or more cells called a Secondary Cell Group (SCG). The MN and SN are connected via a network interface and at least the MN is connected to the core network.

In a dual connectivity case, the WTRU may be configured with two Medium Access Control (MAC) entities: one MAC entity for the MCG and one MAC entity for SCG. The WTRU may be configured to receive and process a radio resource control (RRC) reconfiguration message via the MCG, wherein the reconfiguration may result in SCG addition, change/modification, or release. Also, the WTRU may be configured to receive and process an RRC Reconfiguration message via the SCG, wherein the reconfiguration may not require coordination with MN.

SUMMARY

Examples and embodiments of uplink (UL) synchronization maintenance are provided herein. Examples and embodiments of secondary cell group (SCG) deactivation, dormancy or both are provided herein. The examples and embodiments may apply to multi-radio dual connectivity (MR-DC) or may apply to other wireless communications systems. Examples and embodiments, used individually or in any combination, may include the following. A wireless transmit/receive unit (WTRU) may receive indication information, from a network, indicating a UL configuration of one or more UL signals and indicating one or more triggering conditions for transmission of the one or more UL signals. Based on one of reception of a deactivation command from the network or fulfillment of one or more conditions for WTRU-triggered deactivation of an SCG, the WTRU may deactivate the SCG and may run a time value associated with the SCG. Also, the WTRU may transmit the one or more UL signals via the SCG to the network. Additionally or alternatively, based on the UL configuration and the fulfillment of the one or more triggering conditions for transmission of the one or more UL signals, the WTRU may transmit the one or more UL signals via the SCG to the network. The WTRU may receive, via a master cell group (MCG) from the network, one of an in-synch indication for the SCG or an out-of-synch indication for the SCG. Further, based on the reception of the out-of-synch indication for the SCG including a timing advance (TA) delta value, the WTRU may update a UL TA towards the SCG based on the TA delta value and may restart the running of the time value associated with the SCG. Moreover, using the updated UL TA towards the SCG, the WTRU may transmit one or more subsequent UL signals via the SCG to the network.

In an example, the one or more UL signals are for use in maintaining a UL synchronization with an SCG while the SCG is deactivated, dormant, in a power saving state or operating in long discontinuous reception (DRX). In a further example, the WTRU may stop monitoring of an SCG physical downlink control channel (PDCCH) based on the one of reception of the deactivation command from the network or the fulfillment of one or more conditions for WTRU-triggered deactivation of the SCG.

In another example, based on the reception of an in-synch indication, the WTRU may restart the running of the time value associated with the SCG. Further, based on the reception of an out-of-synch indication for the SCG without a TA delta value, the WTRU may stop the running of the time value associated with the SCG and consider the SCG out of synchronization with the WTRU. Moreover, the one or more UL signals may include one or more of a Sounding Reference Signal (SRS) or a random access channel (RACH) preamble.

Further, the one or more triggering conditions for transmission of the UL signals may include one or more of timing information, expiry of the time value associated with the SCG or an SCG downlink (DL) signal level change. Also, the time value associated with the SCG may be a time alignment timer (TAT) value associated with the SCG. In addition, the running of the time value associated with the SCG may include one of starting running of the time value associated with the SCG or keeping running of the time value associated with the SCG. Further, based on the time value associated with the SCG, the WTRU may activate the SCG. The WTRU may also transmit UL data via the SCG without using a random access (RA) procedure.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 1C is a system diagram illustrating an example radio access network (RAN) and an example core network (CN) that may be used within the communications system illustrated in FIG. 1A according to an embodiment;

DETAILED DESCRIPTION

Figure 1A:
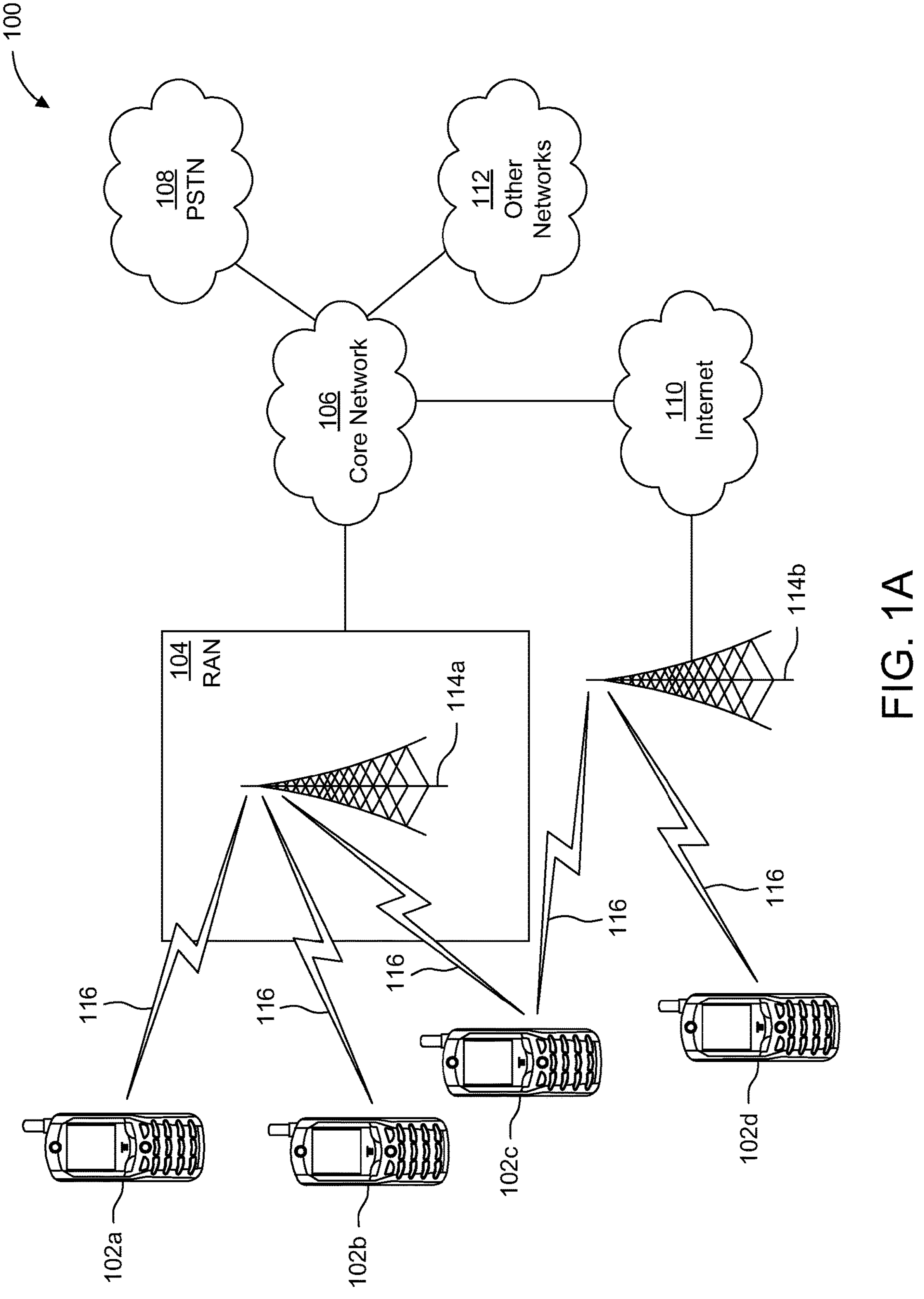
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, and the like. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using NR.

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114_a_ and the WTRUs 102_a_, 102_b_, 102_c_ may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114_b_ in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114_b_ and the WTRUs 102_c_, 102_d_ may implement a radio technology such as IEEE 802.11 to establish a wireless local area network (WLAN). In an embodiment, the base station 114_b_ and the WTRUs 102_c_, 102_d_ may implement a radio technology such as IEEE 802.15 to establish a wireless personal area network (WPAN). In yet another embodiment, the base station 114_b_ and the WTRUs 102_c_, 102_d_ may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114_b_ may have a direct connection to the Internet 110. Thus, the base station 114_b_ may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102_a_, 102_b_, 102_c_, 102_d_. The data may have varying quality of service (QOS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102_a_, 102_b_, 102_c_, 102_d_ to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102_a_, 102_b_, 102_c_, 102_d_ in the communications system 100 may include multi-mode capabilities (e.g., the WTRUs 102_a_, 102_b_, 102_c_, 102_d_ may include multiple transceivers for communicating with different wireless networks over different wireless links). For example, the WTRU 102_c_ shown in FIG. 1A may be configured to communicate with the base station 114_a_, which may employ a cellular-based radio technology, and with the base station 114_b_, which may employ an IEEE 802 radio technology.

Figure 1B:
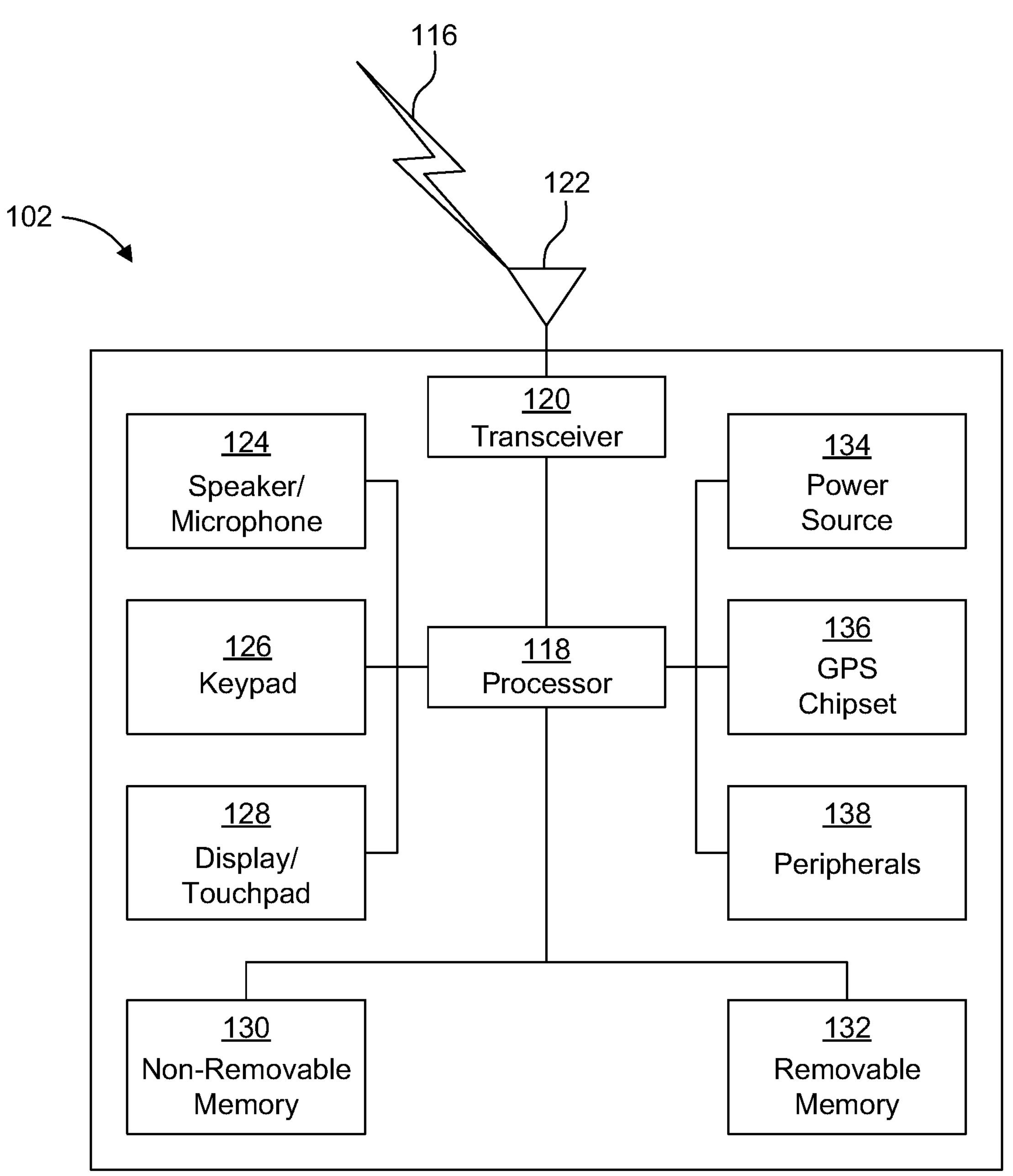
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114_a_) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception).

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHZ, 10 MHZ, and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHZ. In Japan, the available frequency bands are from 916.5 MHz to 927.5 MHz. The total bandwidth available for 802.11ah is 6 MHz to 26 MHz depending on the country code.

Figure 1D:
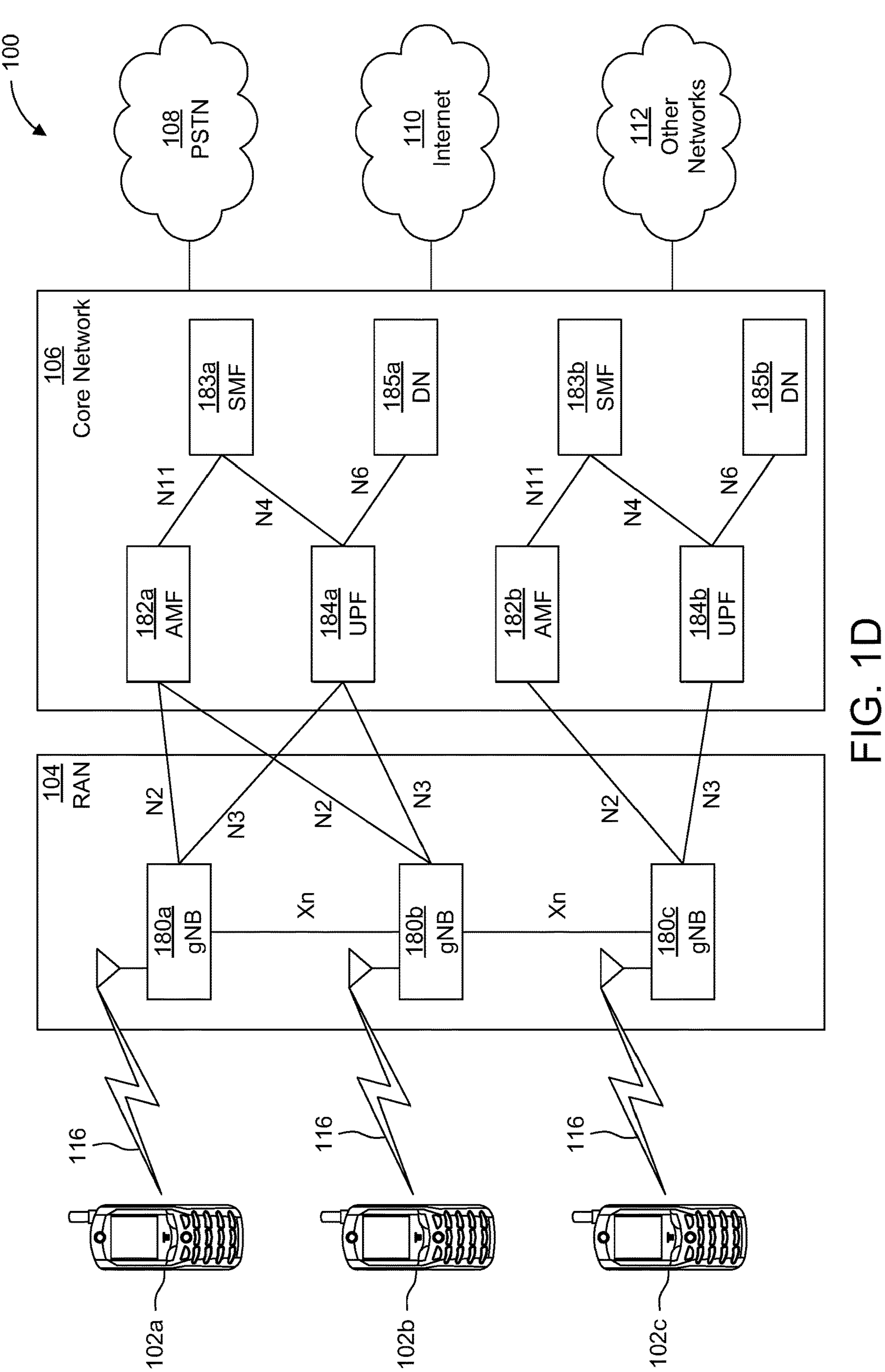
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106.

The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (COMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 106 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While the foregoing elements are depicted as part of the CN 106, it will be appreciated that any of these elements may be owned and/or operated by an entity other than the CN operator.

The AMF 182*a*, 182*b* may be connected to one or more of the gNBs 180*a*, 180*b*, 180*c* in the RAN 104 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of non-access stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and the like. The AMF 182*a*, 182*b* may provide a control plane function for switching between the RAN 104 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 106 via an N11 interface. The SMF 183*a*, 183*b* may also be connected to a UPF 184*a*, 184*b* in the CN 106 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 104 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local DN 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The description herein is for exemplary purposes and does not intent to limit in any way the applicability of the methods described further herein to other wireless technologies and/or to wireless technology using different principles, when applicable. In examples and embodiments provided herein, the term network may refer to one or more gNBs which in turn may be associated with one or more Transmission/Reception Points (TRPs), one or more base stations, or any other node in the radio access network. Further, in examples and embodiments provided herein, the term multi-radio dual connectivity (MR-DC) may indicate a dual connectivity between E-UTRA and NR nodes, or between two NR nodes.

Examples, embodiments and principles of multi-connectivity are provided herein. A WTRU may be configured to utilize resources provided by two different nodes connected via non-ideal backhaul, wherein the nodes may provide access using the same or different RATs. The nodes may be base stations. One node may act as a Master Node (MN) controlling resources associated with one or more cells called a Master Cell Group (MCG), and another node may act as a secondary node (SN) controlling resources associated with one or more cells called a Secondary Cell Group (SCG). The MN and the SN are connected via a network interface and at least the MN is connected to the core network.

In a dual connectivity case, the WTRU may be configured with two Medium Access Control (MAC) entities: one MAC entity for the MCG and one MAC entity for the SCG. The WTRU may be configured to receive and process a radio resource control (RRC) reconfiguration message via the MCG, wherein the reconfiguration may result in SCG addition, change/modification, or release. Also, the WTRU may be configured to receive and process an RRC Reconfiguration message via the SCG, wherein the reconfiguration may not require coordination with MN.

Examples and embodiments of UL synchronization maintenance are provided herein. Examples and embodiments of SCG deactivation, dormancy or both are provided herein. Examples and embodiments, used individually or in any combination, may include the following. A WTRU may be configured to send a UL signal (Sounding Reference Signal (SRS), random access channel (RACH) preamble, and the like) toward the SCG, and via the SN, to the network while the SCG is deactivated/dormant to maintain UL synchronization. Also, a WTRU may be configured to keep running/start/re-start a time value or a time alignment timer (TAT) associated with the SCG while the SCG is deactivated/dormant. Further, a WTRU may be configured to receive the response to the UL signal sent for synchronization purposes from the network via the MCG; and/or the WTRU may be configured to monitor an SCG physical downlink control channel (PDCCH)/physical downlink shared channel (PDSCH) at specified time/duration/resources while the SCG is deactivated/dormant to get the response from the network, via the SN and the SCG. Moreover, a WTRU may be configured to receive the response to the UL signal sent for synchronization purposes from the network (via a timing advance command (TAC), a random access response (RAR), and the like) indicating it is in UL synchronization or not with the SCG, and if not in synchronization, optionally including a timing advance (TA) update/delta value. In addition, a WTRU may be configured to update the UL TA with the SCG, if the TA update is indicated. Also, a WTRU may be configured to re-start the TAT associated with the SCG if it is in UL synchronization with the SCG (or a TA update was performed). Additionally, a WTRU may be configured to stop the TAT associated with the SCG if it is not in UL synchronization with the SCG (and no TA update was indicated/performed). A WTRU may be configured to perform SCG activation without first performing Random Access (RA) procedure towards the SCG if the TAT associated with the SCG is still running when the WTRU is instructed to perform SCG activation or when the WTRU itself triggers the SCG activation. A WTRU may also be configured to perform RA towards the SCG when activating the SCG if the TAT associated with the SCG is not running when the WTRU is instructed to perform SCG activation or when the WTRU itself triggers the SCG activation.

Examples and embodiments are provided herein of direct UL synchronization status indication from a network via the SCG. A WTRU configured for MR-DC with an MCG and an SCG may perform one or more of the following examples and embodiments individually or in any combination. The WTRU may receive, from the network, a UL configuration indicating UL signals (SRS, RACH preambles, and the like) to be used for maintaining the UL synchronization with the SCG while the SCG is deactivated/dormant. Further, the UL configuration may contain information regarding when/how the UL signal is to be sent (for example, time/frequency information, power levels to be used, number of times the UL signal may need to be repeated, and the like), and when/how the response to the UL signal is to be received (for example, time/frequency information, indication that the response is to be received from network via the SN and the SCG, and the like). In addition, the WTRU may deactivate the SCG based on the reception of a deactivation command from the network, or on the fulfillment of conditions for WTRU triggered SCG deactivation. Also, the WTRU may stop monitoring the SCG PDDCH. Moreover, the WTRU may start/re-start the TAT associated with the SCG. Additionally, the WTRU may send the configured UL signal toward the SCG, and via the SN, to the network on determining it is time to send them and the SCG is still deactivated. Further, the WTRU may start monitoring the SCG PDCCH/PDSCH or SCG for reception of an indication whether it is in UL synchronization or not with the SCG. In addition, the WTRU may stop monitoring the SCG PDCCH/PDSCH after the reception of an indication whether it is in UL synchronization or not with the SCG. If the indication is an in-synch indication, the WTRU may restart the TAT associated with the SCG. If the indication is an out-of-synch indication, the WTRU may stop the TAT associated with the SCG. If the indication includes a TA delta value, the WTRU may update the UL TA towards the SCG based on the indicated value, and restart the TAT associated with the SCG. A WTRU may be configured to perform SCG activation without first performing RA procedure towards the SCG if the TAT associated with the SCG is still running when the WTRU is instructed to perform SCG activation or when the WTRU itself triggers the SCG activation. A WTRU may also be configured to perform RA towards the SCG when activating the SCG if the TAT associated with the SCG is not running when the WTRU is instructed to perform SCG activation or when the WTRU itself triggers the SCG activation.

Examples and embodiments are provided herein of UL synchronization status indication via the MCG. A WTRU configured for MR-DC with an MCG and an SCG may perform one or more of the following examples and embodiments individually or in any combination. The WTRU may receive, from the network, a UL configuration indicating UL signals (SRS, RACH preambles, and the like) to be used for maintaining the UL synchronization with the SCG while the SCG is deactivated/dormant. Further, the UL configuration may contain information regarding when/how the UL signal is to be sent (for example, time/frequency information, power levels to be used, number of times the UL signal may need to be repeated, and the like), and when/how the response to the UL signal is to be received (for example, time/frequency information, indication that the response is to be received from network, via the MN and the MCG, and the like). In addition, the WTRU may deactivate the SCG based on the reception of a deactivation command from the network, or on the fulfillment of conditions for WTRU triggered SCG deactivation. Also, the WTRU may stop monitoring the SCG PDDCH. Moreover, the WTRU may start/re-start the TAT associated with the SCG. Additionally, the WTRU may send the configured UL signal toward the SCG, and via the SN, to the network on determining it is time to send them and the SCG is still deactivated. Further, the WTRU may receive, from the network, an indication whether it is in UL synchronization or not with the SCG, via the MCG. If the indication is an in-synch indication, the WTRU may restart the TAT associated with the SCG. If the indication is an out-of-synch indication, the WTRU may stop the TAT associated with the SCG. If the indication includes a TA delta value, the WTRU may update the UL TA towards the SCG based on the indicated value, and restart the TAT associated with the SCG. A WTRU may be configured to perform SCG activation without first performing RA procedure towards the SCG if the TAT associated with the SCG is still running when the WTRU is instructed to perform SCG activation or when the WTRU itself triggers the SCG activation. A WTRU may also be configured to perform RA towards the SCG when activating the SCG if the TAT associated with the SCG is not running when the WTRU is instructed to perform SCG activation or when the WTRU itself triggers the SCG activation.

Examples and embodiments of activation, deactivation, or both, of secondary cells (SCells) in NR are provided herein. NR supports activation, deactivation, or both, of SCells via a MAC control element (CE). If an SCell is deactivated, the WTRU will not perform any of transmission of an SRS on the SCell, reporting of channel state information (CSI) for the SCell, transmission on an uplink shared channel (UL-SCH) on the SCell, transmission of a RACH on the SCell, monitoring on a PDCCH on the SCell or for the SCell (via another activated SCell) or transmission of data on a physical uplink control channel (PUCCH) on the SCell. A WTRU can be activated, deactivated, or both, via a MAC CE activation, deactivation, or both command. For example, a WTRU can be activated via a MAC CE activation command. Also, a WTRU can be deactivated via a MAC CE deactivation command. A WTRU may also move from activated to deactivated following expiry of an SCell deactivation timer or an SCell deactivation time value. In an example, a WTRU may also move from activated to deactivated upon a determination that an SCell deactivation time has elapsed.

To have a more dynamic mechanism for supporting power savings on SCells, a network also typically supports the concept of dormancy. For dormancy, the WTRU can maintain some of the functionality of an activated SCell, while saving power by not performing PDCCH monitoring. Furthermore, dormancy is achieved by switching a WTRU to a dormant bandwidth part (BWP). The switching may be performed via layer 1 (L1) signaling using DCI. When on the dormant BWP, the WTRU does not transmit SRS. Further, when on the dormant BWP, the WTRU reports CSI, but may only report periodic CSI, may only report semi-static CSI, or both. Also, when on the dormant BWP, the WTRU does not monitor PDCCH on the SCell or for the SCell. Moreover, when on the dormant BWP, the WTRU performs beam management and a beam failure recovery procedure. However, when on the dormant BWP, the WTRU does not transmit on a PUCCH. In addition, when on the dormant BWP, the WTRU does not transmit on a RACH. Dormancy is associated with an activated SCell state-a WTRU can be changed to a dormant BWP when it is in an SCell active state. However, a WTRU cannot be changed to/from a dormant BWP while in an SCell deactivated state. DCI on another SCell can move an SCell from the dormant BWP to a non-dormant BWP.

One or more concepts of SCG dormancy may being standardized. SCG dormancy may also be referred to as SCG/primary cell of the secondary cell group (PSCell) deactivation and still be consistent with the examples provided herein. The concept is to put the whole SCG, such as the PSCell and SCG SCells, in a power saving state when the WTRU does not have a required need for the SCG, and to re-activate it as fast as possible when the need arises. In an example, the WTRU may not have the required need for the SCG when the aggregate data rate of the WTRU bearers are below a certain level or when the SCG radio quality is not good enough. There are several ways of achieving putting the whole SCG in a power saving state and re-activating it as fast as possible. For example, one way may be adopting the SCell dormancy behavior to the PSCell as well. In an example, this way may include associating a dormant BWP to the PSCell. Another way may include having the WTRU effectively operate in single connectivity with the SCG configuration stored and ready to be activated/applied when the need arises. A further way may include operating the SCG in a long discontinuous reception (DRX).

Various mechanisms may be applied for SCG deactivation/dormancy. Example aspects of SCG deactivation/dormancy may include considering only a single deactivated SCG. Other example aspects of SCG deactivation/dormancy may include no PDCCH monitoring while an SCG is deactivated. Additionally or alternatively, during SCG deactivation/dormancy a WTRU may keep performing, may restrict or may relax MN/SN configured radio resource management (RRM) measurements/reporting regarding the SCG while the SCG is deactivated/dormant. Further, SCG deactivation/dormancy may support mobility procedure while the SCG is deactivated, and the like. In examples, mobility procedure may include MCG change, SCG change/modification and the like. In examples, a modification of the SCG may include keeping the SCG, while one or more of changing one or more parameters of the SCG, changing one or more configurations of the SCG, adding one or more SCells for the SCG, or removing one or more SCells for the SCG. Further, a modification of the SCG may be made while also keeping the PSCell.

While the SCG is in a deactivated state, a WTRU may send SN configured measurements. The measurements may be sent embedded in an MCG ULInformation Transfer-MRDC message via signalling radio bearer 1 (SRB1). Also, while the SCG is in a deactivated state, the WTRU can receive an SCG RRCReconfiguration message embedded in an MCG RRC (Connection)Reconfiguration message on SRB1. Further, while the SCG is in a deactivated state, SCG SCells cannot be in an active state. The SCG SCells may be only deactivated, in an example. In several examples, dormancy may be allowed. Also, several examples may include if SCells can be added/reconfigured/released.

In NR, the WTRU has to be synchronized in the DL with the base station to be able to receive data, and synchronized in the UL so that the base station can receive the data from the WTRU. For the DL, the WTRU is said to have synchronization or be in synchronization in the DL when it has properly detected the exact timing when a radio frame starts and the exact timing when an OFDM symbol starts. This process is done by detecting and analyzing a synchronization signal (SS) Block.

To be in synchronization in the UL, the WTRU has to figure out the exact timing when it should send uplink data. The uplink data may be sent on various channels, including, for example, a PUSCH, a PUCCH or both. Since a gNB is handling multiple WTRUs, the network has to ensure that the UL signal from every WTRU should be aligned with a common receiver timer of the network or a common receiver time value of the network. Thus, UL synchronization is basically adjusting the WTRU's uplink Tx timing and is done via the RACH process.

For the RACH process, the WTRU transmits a physical random access channel (PRACH) preamble, and the network responds with a RAR that includes TA information. Also, additional information such as a WTRU identity cell radio network temporary identifier (C-RNTI), a UL grant for a subsequent message from the WTRU, and the like can be included in the RAR. The WTRU will use the indicated TA to adjust its UL transmission timing. If the WTRU does not receive the RAR within a given time, known as the ra-ResponseWindow, it will attempt a new RA procedure.

The RACH process or procedure can be either contention-based or contention free. In contention-based random access (CBRA), the WTRU randomly selects a PRACH preamble from a possible set of preambles specified in the 3GPP standards, while for contention free random access (CFRA), the WTRU is provided with a specific preamble that it has to use when performing RACH. In an example, the WTRU may obtain the specific preamble while the WTRU is in a connected state. In the case of CBRA, a collision could happen where more than one WTRUs attempt RACH using the same preamble, and a contention resolution has to performed. For example, if two WTRUs sent a random access request with the same PRACH, both WTRUs will receive the same C-RNTI and resource allocation, and both WTRUs will send L2/L3 signals or messages through the same resource allocation to the network. The network may not be able to decode either signal (for example, the two signals may interfere with/cancel out each other), or the network may decode only one of the signals. In the former case, both WTRUs will consider the RACH process as failed (as no HARQ-ACK for the signals or messages the WTRUs have sent is received by the WTRUs) and will try or retry again. In the latter case, the network will provide the HARQ-ACK only to the WTRU whose signal was decoded properly, and the other WTRU thus may have to attempt the RACH process again.

To maintain UL time alignment, ongoing TACs may be sent by the gNB while the WTRU is in connected mode. This could be, for example, based on received timing of an SRS or Channel Quality Indicator (CQI) from the WTRU. Each time a TAC is received, the WTRU may restart a time value or a timer known as the TAT. From a higher layer perspective, the WTRU considers it is synchronized in the UL while the TAT is running, and not synchronized if the TAT has expired or elapsed. If not synchronized in the UL, the WTRU has to get UL resynchronized (for example, via the RACH process as discussed above) before it can transmit data again.

SCG deactivation is intended to be used mainly for WTRU power savings. When the need arises for the SCG to become re-activated (for example, data usage for the WTRU increases, UL/DL data arrives for a bearer associated with an SCG, and the like), it is important the SCG is ready to be used as fast as possible. If fast re-activation is not possible, then SCG deactivation/re-activation will have no advantage from releasing/adding the SCG (except possibly for some signaling reduction, as the SCG configuration may not need to be sent to the WTRU in the former case). As such, it is beneficial to keep the WTRU in synchronization in the UL with the SCG while the SCG is deactivated to avoid the need to perform the RACH procedure every time the SCG is to be re-activated.

Several example approaches may be applied regarding this, and one example includes having the WTRU keep running the TAT while the SCG is deactivated. If the TAT has expired when the SCG is re-activated, the WTRU may have to first perform an RA procedure to the SCG before the re-activation; otherwise, it may try the re-activation without performing RA. The shortcomings with this approach may include that the WTRU may be still in synchronization even after the TAT expiry. For example, the WTRU may still be in synchronization because the WTRU was stationary or has little mobility while the SCG was deactivated. In these cases, the RA procedure was not required and thus will cause unnecessary latency in SCG re-activation. Further shortcomings with this approach may include that the WTRU may be out of synchronization even before the TAT expiry. In this case, the WTRU will first attempt re-activation without RA (possibly several times), which will not succeed, and then have to fall back to RA, thereby increasing the SCG re-activation time as compared to always performing RA upon re-activation.

Example methods for efficient UL synchronization maintenance with a deactivated SCG are provided herein. As provided herein, several methods are proposed to effectively maintain the WTRU's UL synchronization with the PSCell while the SCG is deactivated, to enable a faster activation of the SCG. Although examples provided herein are mainly focused on the scenario of SCG deactivation/activation, most of the methods are equally applicable for normal operation, for example, maintaining SCG UL synchronization while SCG is active but no data transmission/reception is happening over SCG, maintaining MCG UL synchronization when no data transmission/reception is happening over MCG, and the like. Example methods provided herein for UL synchronization maintenance with a deactivated SCG increase efficiency in wireless communication by keeping the power savings of SCG deactivation but also allowing for re-activation of the SCG as fast as possible.

In examples provided herein, the terms deactivated SCG and dormant SCG are used interchangeably. In examples provided herein, the terms signal and message are used interchangeably.

Examples provided herein include WTRU configuration for maintaining UL synchronization. In one example method, the WTRU is provided with a UL configuration that the WTRU uses to maintain a UL synchronization with an SCG that is deactivated. The configuration may specify UL signal(s)/message(s) that the WTRU has to send to the network while the SCG is deactivated. The configuration may also specify how the signal(s) have to be sent to the network. For example, the configuration may specify frequency resources, repetitions, power levels, and the like, used by the signal(s) when sent to the network. Further, the configuration may specify when the signal(s) has to be sent to the network. For example, the configuration may specify timing information regarding the signal(s). The timing information may be specified in absolute time, for example, a frame/slot number, or specified in relation to the TAT associated with the SCG, for example, when the SCG has been deactivated for a duration equivalent to x % of the TAT. If the SCG is still in deactivated/dormant mode when the timing conditions are fulfilled for the sending of the UL signal, the WTRU sends the UL signal to the SCG.

In another example method, the UL configuration includes timing information regarding when the WTRU is expected to receive a response from the network from the time it has sent the UL signal. This timing information could be exact timing information, for example, a frame/slot number. This timing information could also be relative time information, for example, x ms after the sending of the UL signal. Further, this timing information could be a time window within which the WTRU can receive the response, for example, between x and y ms after the sending of the UL signal.

In an additional example method, the UL signal is an SRS signal. The UL configuration in this case may include additional information such as the number of SRSs that have to be sent, the exact timing for each SRS, relative time between the SRSs, the power level to be used, and the like.

In a further example method, the UL signal is a random access request. The UL configuration in this case may include additional information such as a PRACH preamble, an RA response window time, a number of RA attempts, power ramping configurations, and the like. If no PRACH preamble is provided, the WTRU may use contention-based RA by choosing a preamble randomly. The choice of this preamble could be done in the same way as normal RACH procedure or it can be done in a different way. For example, the WTRU may use only a subset of the possible PRACH preambles for RA.

In one example method, the UL configuration includes an indication of whether the response from the network regarding the UL signal is to be received via the MCG or the SCG. If the response from the network is to be received via the SCG, the UL configuration may include additional information regarding when/how the WTRU should monitor the SCG PDCCH to receive the response. For example, the addition information may include time/duration relative to the when the UL signal was sent, absolute time/duration information, frequency information, and the like.

The UL configuration may be received with the SCG deactivation command or provided to the WTRU in a separate configuration message, either before or after SCG deactivation. In one method, the WTRU re-starts the TAT associated with the SCG in response to the reception of the UL configuration message.

In one method, the WTRU keeps the TAT associated with the SCG running upon the reception of the UL configuration message. In another method, the WTRU re-starts the TAT associated with the SCG when the SCG gets deactivated. In a further method, the WTRU keeps the TAT associated with the SCG running when the SCG gets deactivated.

Examples provided herein include reception of in-synch indications and associated WTRU actions. If the WTRU is in synchronization, the network may indicate this to the WTRU, either implicitly or explicitly. An implicit indication could be no reception of a response message from the network within a given duration after the sending of the UL signal. An explicit indication could be a reception of a message. Example messages include a new in-synch message received in response to an SRS, a RAR with a TA value of 0 in response to a RACH Preamble, and the like.

In one example method, the in-synch indication is sent to the WTRU from or via the MCG. In another method, the in-synch indication is sent to the WTRU directly via the SCG. In order to enable this, the WTRU may be configured with an additional configuration that indicates the timing/frequency configuration when/where to expect this indication from the SCG. In examples, this additional configuration may be sent in addition to or as an alternative to the UL configuration that configured an SRS configuration. The WTRU may then monitor the PDCCH of the SCG just at that instant (or instances) to read the in-synch indication. If the WTRU does not receive PDCCH in the instant (or instances) where it was configured to receive the TA delta value, then the WTRU may consider that to be an implicit in-synch indication.

In one example method, when the WTRU receives the in-synch indication, it will restart the TAT. In a further example method, the WTRU keeps the TAT running after the reception of the in-synch indication. In another example method, the next time the WTRU receives the SCG activation command, or activates the SCG based on the fulfillment of WTRU triggered SCG activation, such as the arrival of UL data associated with an SCG bearer, the WTRU may send an SRS if the TAT has not expired, but the WTRU may send an RA if the TAT has expired.

In an additional example method, the next time the WTRU receives the SCG activation command, or activates the SCG based on the fulfillment of WTRU triggered SCG activation such as the arrival of UL data associated with an SCG bearer, the WTRU may perform RA even if the TAT has not expired, depending on how much of the TAT is still left. For example, if only 10% of the TAT is left, the WTRU may decide to do the RA with a 90% (i.e., 1-0.1) probability. For example, the WTRU may draw a random value from a uniform distribution between 0 and 1, and decide to do RA if the value drawn is less than 0.9.

In one example method, after the WTRU has restarted the TAT due to the reception of the in-synch indication, the WTRU may behave in the same way as it had immediately after SCG deactivation or reception of the UL signal configuration. For example, the WTRU may send the UL signal again when x % of the TAT has elapsed.

Examples provided herein include reception of out-of-synch indications and associated WTRU actions. If the WTRU is not in synchronization, the network may indicate this to the WTRU, either implicitly or explicitly. An implicit indication could be no reception of a response message from the network within a given duration after the sending of the UL signal. An explicit indication could be a reception of a message. For example, the explicit indication may be a new or a modified "out-of-synch" message received in response to an SRS. Also, the explicit indication may be a reception of a message containing a TA delta value. As examples, the explicit indication may be a TA value received in an RAR in response to a RACH preamble, a TAC or a new timing advance adjustment message received in response to an SRS, and the like.

In one example method, the out-of-synch indication or the TA delta value is sent to the WTRU via the MCG. For example, this message may be a TAC command sent from the network, via the MN using the MCG, including an indication that the TA adjustment is referring to the SCG.

Figure 2:
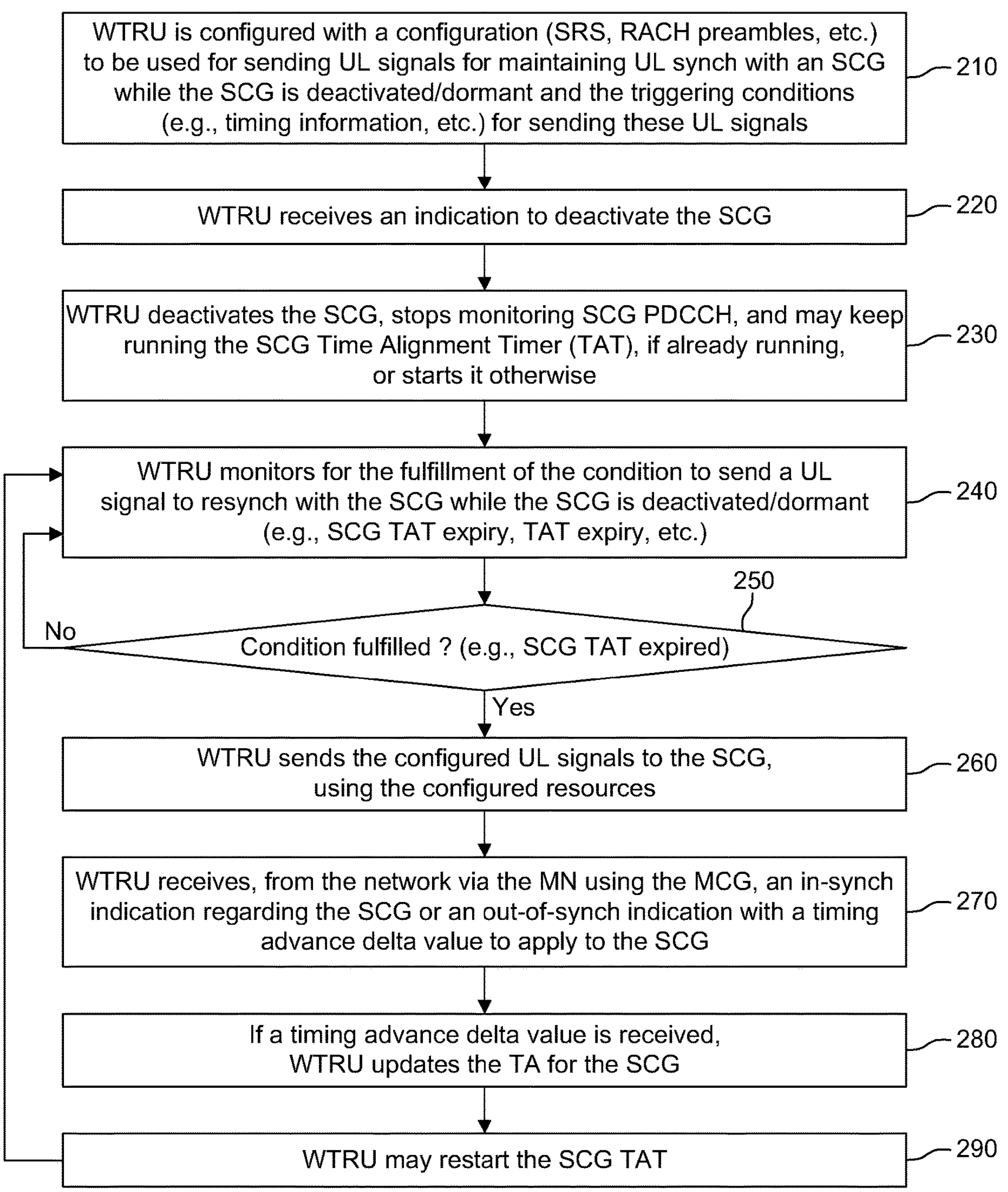
FIG. 2 is a diagram illustrating an example of uplink (UL) synchronization maintenance and deactivation of a secondary cell group (SCG)

FIG. 2 is a diagram illustrating an example of UL synchronization maintenance and deactivation of an SCG. In an shown example in diagram 200, a WTRU may be configured with a configuration to be used for sending one or more UL signal(s) for maintaining UL synchronization with an SCG while the SCG is deactivated, dormant or both 210. The configuration may include information concerning SRS(s), RACH preambles, and the like. The configuration may also include triggering conditions for sending the UL signals. The triggering conditions may include timing information and the like. In example, the configuration may include configured resources for the WTRU to send UL signals.

Also, the WTRU may receive an indication to deactivate the SCG 220. Further, the WTRU may deactivate the SCG and may stop monitoring an SCG PDCCH 230. The WTRU may also keep running the SCG TAT, if already running, or if otherwise, the WTRU may start the SCG TAT.

Moreover, the WTRU may monitor for the fulfillment of a condition, which may be a triggering condition, to send a UL signal to resynchronize with the SCG while the SCG is deactivated, dormant or both 240. The condition may include one or more of a TAT expiry, an SCG TAT expiry, expiry of another type of timer, expiry of a time value, determination that an SCG time has elapsed, and the like.

In examples, the WTRU may check or may determine if the condition is fulfilled. In an example, the condition is fulfilled 250 and the WTRU may accordingly send the configured UL signals to the SCG, using the configurated resources 260. In an example, the condition may be fulfilled when the SCG TAT has expired. In another example, the condition may be fulfilled when another type of timer has expired, another type of time value has expired or a determination that another type of time has elapsed. In another example, the condition is not fulfilled 250 and the WTRU may accordingly continue to monitor for the fulfillment of the condition 240. The WTRU may continue its monitoring until the condition is fulfilled 250, until the end of a certain time or until unless the WTRU receives a contrary instruction.

Further, the WTRU may receive, from the network via the MN using the MCG, an in-synch indication regarding the SCG 270. Additionally or alternatively, the WTRU may receive, from the network via the MN using the MCG, an out-of-synch indication with a TA value to apply to the SCG 270. In an example, the TA value may be a TA delta value.

Additionally, if a TA value or a TA delta value is received, the WTRU may update the TA for the SCG 280. Moreover, the WTRU may restart the SCG TAT 290. Further, the WTRU may then continue to monitor for fulfillment of the condition to send the UL signal to resynchronize with the SCG while the SCG is deactivated, dormant or both. In an example, the condition may be a triggering condition.

Accordingly, upon reactivation of the SCG, the WTRU will already be synchronized with the SCG. As a result, the WTRU may use the SCG without the need for a RACH procedure. This approach results in more efficient wireless communications, power savings for the WTRU and faster use of the SCG by the WTRU upon SCG reactivation. For example, this approach results in more efficient UL synchronization maintenance, including UL synchronization maintenance with a deactivated SCG.

In one example method, the out-of-synch indication or the TA delta value is sent to the WTRU directly from the network via the SCG. In order to enable this, the WTRU may be configured with an additional configuration that indicates the timing/frequency configuration regarding when/where to expect the out-of-synch indication or the TA delta value from the network via the SCG. In an example, the additional configuration may be sent to the WTRU along with the UL configuration that configured an SRS configuration. The WTRU may then monitor the PDCCH of the SCG just at that instant, or instances, to read the out-of-synch indication or the TA delta value. If the WTRU does not receive a signal on the SCG PDCCH in the instant, or instances, where it was configured to receive the TA delta value, then the WTRU may consider that to be an implicit out-of-synch indication.

In a further example method, the TA adjustment may be performed in two steps, in order to avoid the unnecessary monitoring of the SCG PDCCH for TA delta values if the WTRU was in synchronization. The WTRU may monitor the PDCCH of the SCG to get the TA delta only if it has first received an explicit out-of-synch indication via the MCG.

In one example method, when the WTRU receives an implicit/explicit out-of-synch message, but no TA delta value, the WTRU could initiate an RA procedure towards the PSCell to get the UL back in synchronization. Afterwards, the WTRU may deactivate the SCG and restart the TAT.

In a further example method, the reception of an implicit/explicit out-of-synch message, but no TA delta value, is considered by the WTRU as an implicit SCG re-activation message. The WTRU may perform RA upon the SCG re-activation, and may keep the SCG activated. In examples, the WTRU may keep the SCG activated until an explicit SCG deactivation message is received from the network, until a certain configurable time duration has elapsed, until conditions for WTRU triggered SCG deactivation are fulfilled (such as no DL/UL data for SCG bearers for a certain configurable duration, and the like), and the like.

In another example method, when the WTRU receives an implicit/explicit out-of-synch message but not a TA delta value, the WTRU may stop the TAT. For example, the WTRU may consider the TAT expired. In a further example, the WTRU may consider that a time has elapsed. The next time the WTRU receives the SCG activation command, or activates the SCG based on the fulfillment of WTRU triggered SCG activation such as the arrival of UL data associated with an SCG bearer, the WTRU may perform RA.

In an additional example method, when the WTRU receives an implicit/explicit out-of-synch message but not a TA delta value, the WTRU may stop the TAT. For example, the WTRU may consider the TAT expired. In a further example, the WTRU may consider that a time has elapsed.

The next time the WTRU receives the SCG activation command, or activates the SCG based on the fulfillment of WTRU triggered SCG activation such as the arrival of UL data associated with an SCG bearer, the WTRU may send an SRS.

In one example method, when the WTRU receives an implicit/explicit out-of-synch message but not a TA delta value. Accordingly, the WTRU may keep the TAT running. The next time the WTRU receives the SCG activation command, or activates the SCG based on the fulfillment of WTRU triggered SCG activation such as the arrival of UL data associated with an SCG bearer, the WTRU may send an SRS if the TAT has not expired, but the WTRU may send an RA if the TAT has expired. For example, the WTRU may send an SRS upon a determination that a time has not elapsed, but the WTRU may send an RA upon a determination that a time has elapsed.

Figure 3:
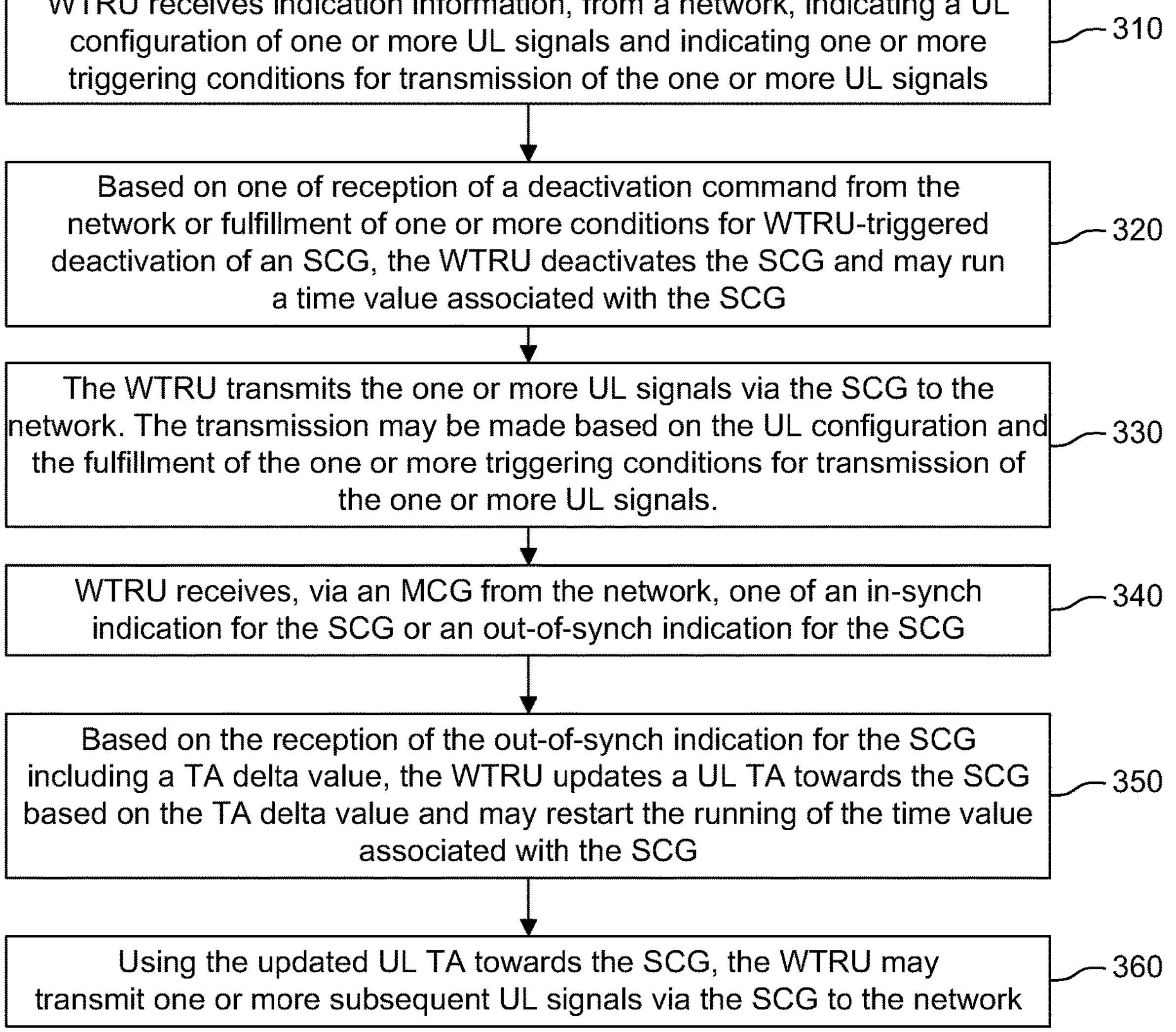
FIG. 3 is a diagram illustrating another example of UL synchronization maintenance and deactivation of an SCG.

FIG. 3 is a diagram illustrating another example of UL synchronization maintenance and deactivation of an SCG. In an example shown in diagram 300, a WTRU may receive indication information, from a network, indicating a UL configuration of one or more UL signals and indicating one or more triggering conditions for transmission of the one or more UL signals 310. Based on one of reception of a deactivation command from the network or fulfillment of one or more conditions for WTRU-triggered deactivation of an SCG, the WTRU may deactivate the SCG and may run a timer associated with the SCG or run a time value associated with the SCG 320. Also, the WTRU may transmit the one or more UL signals via the SCG to the network 330. In an example, the transmission may be based on the UL configuration and the fulfillment of the one or more triggering conditions for transmission of the one or more UL signals.

The WTRU may receive, via an MCG from the network, one of an in-synch indication for the SCG or an out-of-synch indication for the SCG 340. Further, based on the reception of the out-of-synch indication for the SCG including a TA delta value, the WTRU may update a UL TA towards the SCG based on the TA delta value and may restart the running of the timer associated with the SCG or restart the running of the time value associated with the SCG 350. Moreover, using the updated UL TA towards the SCG, the WTRU may transmit one or more subsequent UL signals via the SCG to the network 360. Additionally or alternatively, the WTRU may transmit UL data using the updated UL TA towards the SCG. Further, additionally or alternatively, the WTRU may transmit UL transmissions using the updated UL TA towards the SCG.

In an example, the one or more UL signals are for use in maintaining a UL synchronization with an SCG while the SCG is deactivated, dormant, in a power saving state or operating in long DRX. In a further example, the WTRU may stop monitoring of an SCG PDCCH based on the one of reception of the deactivation command from the network or the fulfillment of one or more conditions for WTRU-triggered deactivation of the SCG.

In another example, based on the reception of an in-synch indication, the WTRU may restart the running of the timer associated with the SCG or restart the running of the time value associated with the SCG. Additionally or alternatively, based on the reception of an in-synch indication, the WTRU may restart the running of a different timer associated with the SCG or a second timer associated with the SCG. In another example or in an alternative example, based on the reception of an in-synch indication, the WTRU may restart the running of a different time value associated with the SCG or a second time value associated with the SCG. Further, based on the reception of an out-of-synch indication for the SCG without a TA delta value, the WTRU may stop the running of the timer associated with the SCG or stop the running of the time value associated with the SCG, and consider the SCG out of synchronization with the WTRU. Moreover, the one or more UL signals may include one or more of an SRS or a RACH preamble.

Further, the one or more triggering conditions for transmission of the UL signals may include one or more of timing information, expiry of the timer associated with the SCG, expiry of the time value associated with the SCG, determination that a time associated with the SCG has elapsed or an SCG DL signal level change. In examples, further triggering conditions may include the need to send UL data or a UL signal level change.

Also, the timer associated with the SCG may be a TAT timer associated with the SCG. In addition, the running of the timer associated with the SCG may include one of starting running of the timer associated with the SCG or keeping running of the timer associated with the SCG. Further, based on the timer associated with the SCG, the WTRU may activate the SCG. The WTRU may also transmit UL data via the SCG without using an RA procedure.

Additionally or alternatively, the time value associated with the SCG may be a TAT value associated with the SCG. In addition, the running of the time value associated with the SCG may include one of starting running of the time value associated with the SCG or keeping running of the time value associated with the SCG. Further, based on the time value associated with the SCG, the WTRU may activate the SCG. The WTRU may also transmit UL data via the SCG without using an RA procedure.

Additionally or alternatively, the time associated with the SCG may be a TAT time associated with the SCG. Further, based on a determination that a time associated with the SCG has elapsed, the WTRU may activate the SCG. The time associated with the SCG may be an activation time or an activation time associated with the SCG, in examples. The WTRU may also transmit UL data via the SCG without using an RA procedure.

In one example method, when the WTRU receives a TA delta value, the WTRU may adjust the TA associated with the SCG accordingly and restart the TAT. In a further example method, when the WTRU receives a TA delta value, the WTRU may adjust the TA associated with the SCG accordingly but keeps the TAT running.

Figure 4:
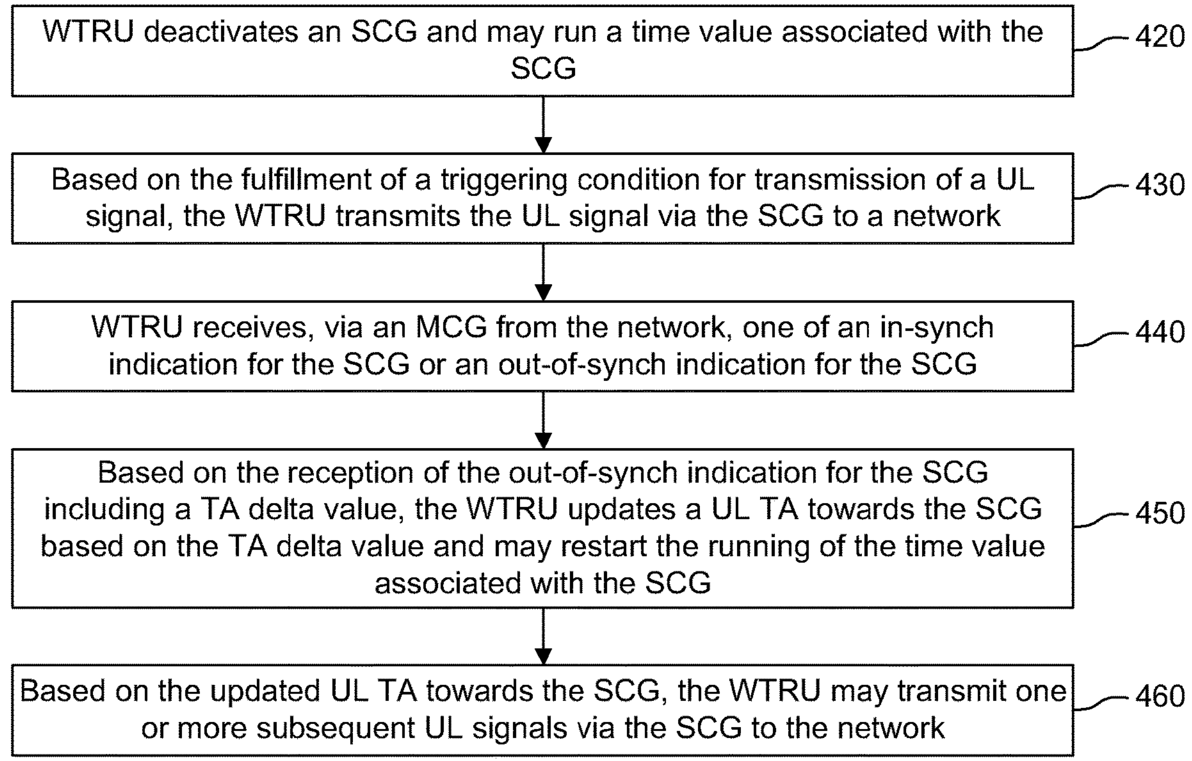
FIG. 4 is a diagram illustrating yet another example of UL synchronization maintenance and deactivation of an SCG.

FIG. 4 is a diagram illustrating yet another example of UL synchronization maintenance and deactivation of an SCG. In an example shown in diagram 400, a WTRU may deactivate the SCG and may run a timer associated with the SCG or a time value associated with the SCG 420. Further, based on the fulfillment of a triggering condition for transmission of a UL signal, the WTRU may transmit the UL signal via the SCG to the network 430.

In addition, the WTRU may receive, via an MCG from the network, one of an in-synch indication for the SCG or an out-of-synch indication for the SCG 440. Also, based on the reception of the out-of-synch indication for the SCG including a TA delta value, the WTRU may update a UL TA towards the SCG based on the TA delta value and may restart the running of the timer associated with the SCG or restart the running of the time value associated with the SCG 450. Moreover, based on the updated UL TA towards the SCG, the WTRU may transmit one or more subsequent UL signals via the SCG to the network 460.

In one example method, the WTRU may be configured with a conditional SRS configuration, which configures the WTRU to send one or more additional SRS(s) to the SCG when the WTRU receives a TA delta value. Similarly, the WTRU may be configured with a conditional SRS configuration, which configures the WTRU to send one or more additional SRS(s) to the SCG if the WTRU receives a TA delta value.

In another example method, the WTRU may be configured with a conditional SRS configuration, which configures the WTRU to send one or more additional SRS(s) to the SCG when the WTRU receives an explicit or implicit out-of-synch indication with no TA delta value. Likewise, the WTRU may be configured with a conditional SRS configuration, which configures the WTRU to send one or more additional SRS(s) to the SCG if the WTRU receives an explicit or implicit out-of-synch indication with no TA delta value.

In a further example method, after the WTRU has restarted the TAT after applying the TA delta, the WTRU may behave in the same way as it had immediately after SCG deactivation or reception of the UL signal configuration. For example, the WTRU may send the UL signal again when a certain percentage, such as x %, of the TAT has elapsed.

Examples are provided herein of selection between SRS and RACH preamble signals based on downlink measurements. The WTRU may maintain its SCG measurements during its SCG deactivation or dormancy. As the downlink measurements, for example, RRM, radio link monitoring (RLM), and the like, may be still running, a hypothetical in-synch/out-of-synch estimation can be done and scaled accordingly to the measurement interval, such as RLM in the DRX case. The hypothetical in-synch and out-of-synch monitoring condition for the UL synchronization signal selection method may be bounded to a certain evaluation time window, such as current RLM procedures, or based on a last available SCG measurement against the threshold.

Under this SCG measurement procedure, and according to the defined in-synch/out-of-synch thresholds, the WTRU may select the UL signal according to rules, such as the following. If the WTRU SCG measurements indicate that the WTRU is in a hypothetical in-synch situation, the WTRU may select the SRS signal to perform the UL transmission for the UL synchronization maintenance and follow any of the network responses described in the above paragraphs.

If the WTRU SCG measurements indicate that the WTRU is in a hypothetical out-of-synch situation, the WTRU may select the RA method for UL synchronization maintenance and follow any of the network responses described in the above paragraphs.

Examples are provided herein of scaling of a TAT based on WTRU mobility. In one method, the WTRU is configured to scale the TAT based on its mobility, its speed or both. For example, the WTRU may be configured to increase the TAT value if the WTRU reduces its speed or stops moving, or shorten the TAT if the WTRU increases its speed or starts moving.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for use in a wireless transmit/receive unit (WTRU), the method comprising:
- receiving, from a first node, indication information indicating an uplink (UL) configuration of one or more random access channel (RACH) preambles, including a power level for the one or more RACH preambles;
- transmitting, to a second node, the one or more RACH preambles at the received power level for the one or more RACH preambles;
- receiving, via the first node, a synchronization indication for the second node;
- based on the reception of the synchronization indication for the second node, wherein the synchronization indication for the second node includes timing advance (TA) information, updating a UL TA towards the second node based on the TA information and restarting a time value associated with the second node; and
- transmitting, using the updated UL TA towards the second node, one or more UL signals to the second node.

2. The method of claim 1, further comprising:
- running a time value associated with the second node, including keeping running of the time value associated with the second node.

3. The method of claim 1, wherein the indication information further indicates one or more triggering conditions for transmission of the one or more RACH preambles, wherein the one or more triggering conditions for transmission of the one or more RACH preambles include timing information.

4. The method of claim 3, wherein the transmission of the one or more RACH preambles to the second node is based on the UL configuration and fulfillment of the one or more triggering conditions for transmission of the one or more RACH preambles.

5. The method of claim 1, wherein the TA information is a timing advance command (TAC) and includes a TA delta value.

6. The method of claim 1, wherein the synchronization indication is one of an in-synch indication or an out-of-synch indication.

7. The method of claim 6, further comprising:
- based on reception of the in-synch indication, restarting running of a time value associated with the second node.

8. The method of claim 7, further comprising:
- based on the time value associated with the second node, transmitting UL data via the second node without using a random access (RA) procedure.

9. The method of claim 6, further comprising:
- based on reception of the out-of-synch indication for the second node, wherein the out-of-synch indication for the second node does not include a TA delta value, stopping running of a time value associated with the second node and considering the second node out of synchronization with the WTRU.

10. A wireless transmit receive unit (WTRU) comprising:

a transceiver; and a processor operatively coupled to the transceiver; wherein:

the transceiver is configured to receive, from a first node, indication information indicating an uplink (UL) configuration of one or more random access channel (RACH) preambles, including a power level for the one or more RACH preambles;

the processor and the transceiver are configured to transmit, to a second node, the one or more RACH preambles at the received power level for the one or more RACH preambles;

the transceiver is configured to receive, via the first node, a synchronization indication for the second node;

the processor and the transceiver are configured to, based on the reception of the synchronization indication for the second node, wherein the synchronization indication for the second node includes timing advance (TA) information, update a UL TA towards the second node based on the TA information and restart a time value associated with the second node; and the processor and the transceiver are configured to transmit, using the updated UL TA towards the second node, one or more UL signals to the second node.

11. The WTRU of claim 10, wherein the processor is further configured to run a time value associated with the second node including keeping running of the time value associated with the second node.

12. The WTRU of claim 10, wherein the indication information further indicates one or more triggering conditions for transmission of the one or more RACH preambles, wherein the one or more triggering conditions for transmission of the one or more RACH preambles include timing information.

13. The WTRU of claim 12, wherein the transmission of the one or more RACH preambles to the second node is based on the UL configuration and fulfillment of the one or more triggering conditions for transmission of the one or more RACH preambles.

14. The WTRU of claim 10, wherein the TA information is a timing advance command (TAC) and includes a TA delta value.

15. The WTRU of claim 10, wherein the synchronization indication is one of an in-synch indication or an out-of-synch indication.

16. The WTRU of claim 15, wherein the processor and the transceiver are further configured to, based on reception of the in-synch indication, restart running of a time value associated with the second node.

17. The WTRU of claim 16, wherein the processor and the transceiver are further configured to, based on the time value associated with the second node, transmit UL data to the second node without using a random access (RA) procedure.

18. The WTRU of claim 15, wherein the processor and the transceiver are further configured to, based on reception of the out-of-synch indication for the second node, wherein the out-of-synch indication for the second node does not include a TA delta value, stop running of a time value associated with the second node and consider the second node out of synchronization with the WTRU.

* * * * *